US008368684B2

(12) United States Patent
Lee

(10) Patent No.: US 8,368,684 B2
(45) Date of Patent: Feb. 5, 2013

(54) ORGANIC LIGHT EMITTING DISPLAY DEVICE, METHOD OF DRIVING THE SAME AND POWER SAVING UNIT THEREOF

(75) Inventor: Jae-Sung Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 424 days.

(21) Appl. No.: 12/656,227

(22) Filed: Jan. 21, 2010

(65) Prior Publication Data

US 2010/0188392 A1 Jul. 29, 2010

(30) Foreign Application Priority Data

Jan. 23, 2009 (KR) ........................ 10-2009-0006201

(51) Int. Cl.
*G06F 3/038* (2006.01)

(52) U.S. Cl. ........................... 345/212; 345/690; 345/82

(58) Field of Classification Search .................... 345/55, 345/76, 77, 82–84, 87–89, 98–100, 204, 345/211–215, 690

See application file for complete search history.

(56) References Cited

U.S. PATENT DOCUMENTS

| | | | | |
|---|---|---|---|---|
| 2003/0080967 | A1* | 5/2003 | Milch et al. | 345/589 |
| 2003/0107681 | A1* | 6/2003 | Otawara et al. | 348/673 |
| 2003/0122807 | A1* | 7/2003 | Kataoka et al. | 345/204 |
| 2004/0080521 | A1* | 4/2004 | Nose et al. | 345/690 |
| 2004/0201583 | A1 | 10/2004 | Burroughes et al. | |
| 2006/0033445 | A1* | 2/2006 | Kim et al. | 315/169.3 |
| 2007/0040820 | A1* | 2/2007 | Lee | 345/204 |
| 2007/0171218 | A1* | 7/2007 | Hong et al. | 345/211 |
| 2008/0246698 | A1* | 10/2008 | Eom | 345/76 |

FOREIGN PATENT DOCUMENTS

| | | | |
|---|---|---|---|
| EP | 1308921 | A2 | 5/2003 |
| EP | 1758357 | A2 | 2/2007 |
| JP | 2001-215930 | A | 8/2001 |
| JP | 2001-228847 | A | 8/2001 |
| JP | 2002-511608 | A | 4/2002 |
| JP | 2003-108076 | A | 4/2003 |

(Continued)

OTHER PUBLICATIONS

European Search Report in EP 10250108.7-2205/2211328, dated Oct. 31, 2011 (Lee).

(Continued)

*Primary Examiner* — Amare Mengistu
*Assistant Examiner* — Koosha Sharifi-Tafreshi
(74) *Attorney, Agent, or Firm* — Lee & Morse, P.C.

(57) ABSTRACT

An organic light emitting display device includes a pixel unit including data lines, a data driving unit providing data signals corresponding to first and second data to the data lines, a timing controlling unit controlling the data driving unit and supplying the first data from the outside, and a power supply for the pixel, data driving, and timing controlling units. A converting unit may receive the first data from the timing controlling unit, convert the first data into the second data, and transmit the converted second data to the data driving unit. When the first data supplied from the timing controlling unit has a digital bit corresponding to one of a first range for displaying white-related colors and a second range for displaying black-related colors, the converting unit converts the first data into the second data having a digital bit corresponding to one of the second and first ranges, respectively.

17 Claims, 3 Drawing Sheets

FOREIGN PATENT DOCUMENTS

| | | | |
|---|---|---|---|
| JP | 2003-216092 | A | 7/2003 |
| JP | 2007-060666 | A | 3/2007 |
| JP | 2007-150831 | A | 6/2007 |
| JP | 2008-252185 | A | 10/2008 |
| JP | 2009-009090 | A | 1/2009 |
| KR | 10-2004-0061335 | A | 7/2004 |
| KR | 10-2005-0015338 | A | 2/2005 |
| KR | 10-2006-0039569 | A | 5/2006 |
| KR | 10-2007-0014705 | A | 2/2007 |
| KR | 10-2007-0022563 | A | 2/2007 |
| WO | WO 2007/063835 | A1 | 6/2007 |

OTHER PUBLICATIONS

Japanese Office Action in JP 2009-093382, dated Nov. 22, 2011 (Lee).

Japanese Office Action in JP 2009-093382, dated Aug. 28, 2012 (Lee).

* cited by examiner

ORGANIC LIGHT EMITTING DISPLAY DEVICE, METHOD OF DRIVING THE SAME AND POWER SAVING UNIT THEREOF

BACKGROUND

1. Field

Embodiments relates to an organic light emitting display device and a method of driving the same. More particularly, embodiments relate to an organic light emitting display device having reduced power consumption, a method of driving the same, and a power saving unit thereof.

2. Description of the Related Art

Recently, popularity of portable devices, e.g., a laptop computer, a personal digital assistant (PDA), a portable multimedia player (PMP), and the like, is rapidly increasing. In order to improve portability of portable devices, development of smaller, slimmer, and lighter portable device is ongoing.

Such development typically includes miniaturizing and integrating components of portable devices. In contrast to such miniaturization of most components of portable devices, a display of a portable device is required to have a sufficiently large screen for a user to easily watch.

A flat panel display is used as the display for portable devices. The flat panel display is thinner, occupies a less space, and has lower power consumption than a conventional CRT display. Thus, the flat panel display satisfies the requirements of the portable device.

Moreover, as portable devices are popularized, long time use of portable devices without external power becomes important to users. Several approaches for realizing long term use have been proposed. These include development of a high capacity battery and/or various methods of minimizing power consumption. Reduction of power consumption typically includes controlling power consumed by a component of the portable device having the largest power consumption, i.e., the flat panel display.

A liquid crystal display (LCD) is mainly used as the display of the portable device. In order to reduce power consumption of the LCD, a backlight of the LCD may be turned off in a power saving mode. However, since the LCD is a light receiving device that only displays a predetermined image when the backlight is on, the image cannot be substantially displayed when the backlight is turned off.

Further, since the LCD displays an image only due to light emission from the backlight, the power consumption of the backlight means that power consumption of the LCD is substantially the same regardless of the gray scale to be displayed. In other words, in order to display of a low gray scale, e.g., a black tone, image or a high gray scale, e.g., white tone, image, the LCD requires substantially the same amount of power. Therefore, in order to reduce the power consumption, the backlight must be turned off.

Furthermore, use of the backlight limits the potential of the LCD to provide a miniaturized, slimmed, and lighter weight portable device.

SUMMARY

Embodiments are therefore directed to an organic light emitting display device, method of driving the same, and power saving unit thereof, which substantially overcome one or more of the problems due to the limitations and disadvantages of the related art.

It is therefore a feature of an embodiment to provide an organic light emitting display device, method of driving the same, and power saving unit thereof, which reduce power consumed by the display device.

It is therefore another feature of an embodiment to provide an organic light emitting display device, method of driving the same, and power saving unit thereof, which allows an image to be viewed on a display device even when reducing power consumption thereof.

It is still another feature of an embodiment to provide an organic light emitting display device, method of driving the same, and power saving unit thereof to reduce power in accordance with a user input and/or a remaining capacity of a power supply.

At least one of the above and other features and advantages may be realized by providing an organic light emitting display device including a pixel unit including a plurality of pixels connected to scan lines and data lines, a data driving unit configured to receive a first data or a second data and to provide data signals corresponding to the first and second data to the data lines, a timing controlling unit configured to control the data driving unit and supplying the first data input from the outside, a power supply configured to supply electric power to the pixel unit, the data driving unit, and the timing controlling unit, and a converting unit configured to receive the first data from the timing controlling unit, convert the first data into the second data, and transmit the converted second data to the data driving unit. When the first data supplied from the timing controlling unit has a digital bit corresponding to one of a first range for displaying white-related colors and a second range for displaying black-related colors, the converting unit is configured to convert the first data into the second data having a digital bit corresponding to one of the second range and the first range, respectively.

The organic light emitting display device may include a capacity detecting unit configured to generate an enable signal to start the converting unit when a remaining capacity of the power supply is less than a predetermined reference value.

The first range and the second range may correspond to an achromatic color range. Data corresponding to the first range may have a digital bit corresponding to 255 to 230 gray scales. Data corresponding to the second range has a digital bit corresponding to 0 to 25 gray scales. The converting unit may be configured to output the first data to the data driving unit when the first data is outside the first and second ranges.

The organic light emitting display device may include a power saving mode unit configured to generate an enable signal to start the converting unit when a user selects a power saving mode. The organic light emitting display device may include a switching unit configured to receive the first data from the timing controlling unit and output the first data to one of the data driving unit and the converting unit in accordance with at least one of a user input and a capacity of the power supply.

At least one of the above and other features and advantages may be realized by providing a method of driving a self-emission display device, the method including supplying first data from outside, determining whether the first data is within one of a first range for displaying white-related colors and a second range for displaying black-related colors, and reverse converting, when the first data is within one of the first and second ranges, the first data into second data having a digital bit corresponding to the second range and the first range, respectively.

Before determining, the method may include generating an enable signal to start determining. Generating the enable signal may occur when a remaining capacity of the power supply is less than a predetermined reference value or when a user selects a power saving mode.

The first and second ranges may correspond to an achromatic color range. Data corresponding to the first range may have a digital bit corresponding to 255 to 230 gray scales. Data corresponding to the second range may have a digital bit corresponding to 0 to 25 gray scales.

First data may be supplied to the data driving unit when the first data is outside the first and second ranges.

At least one of the above and other features and advantages may be realized by providing a power saving unit for use with a self-emission display device, including a range determining unit configured to determine whether first data supplied from outside is within one of a first range for displaying white-related colors and a second range for displaying black-related colors and a reverse converting unit configured to convert, when range determining unit determines that the first data is within one of the first and second ranges, the first data into second data having a digital bit corresponding to the second range and the first range, respectively, and to output the second data to the self-emission display device.

The reverse converting unit may be configured to output the first data as the second data when the first data is outside either of the first and second ranges.

The power saving unit may include a switching unit configured to output the first data to the self-emission display device in a normal mode and to output the first data to the range determining unit when in a power saving mode.

The power saving unit may include at least one of a capacity detecting unit configured to indicate the power saving mode when a remaining capacity of a power supply of the self-emissive display device is below a predetermined reference value and a power saving mode unit configured to indicate the power saving mode when selected by a user.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
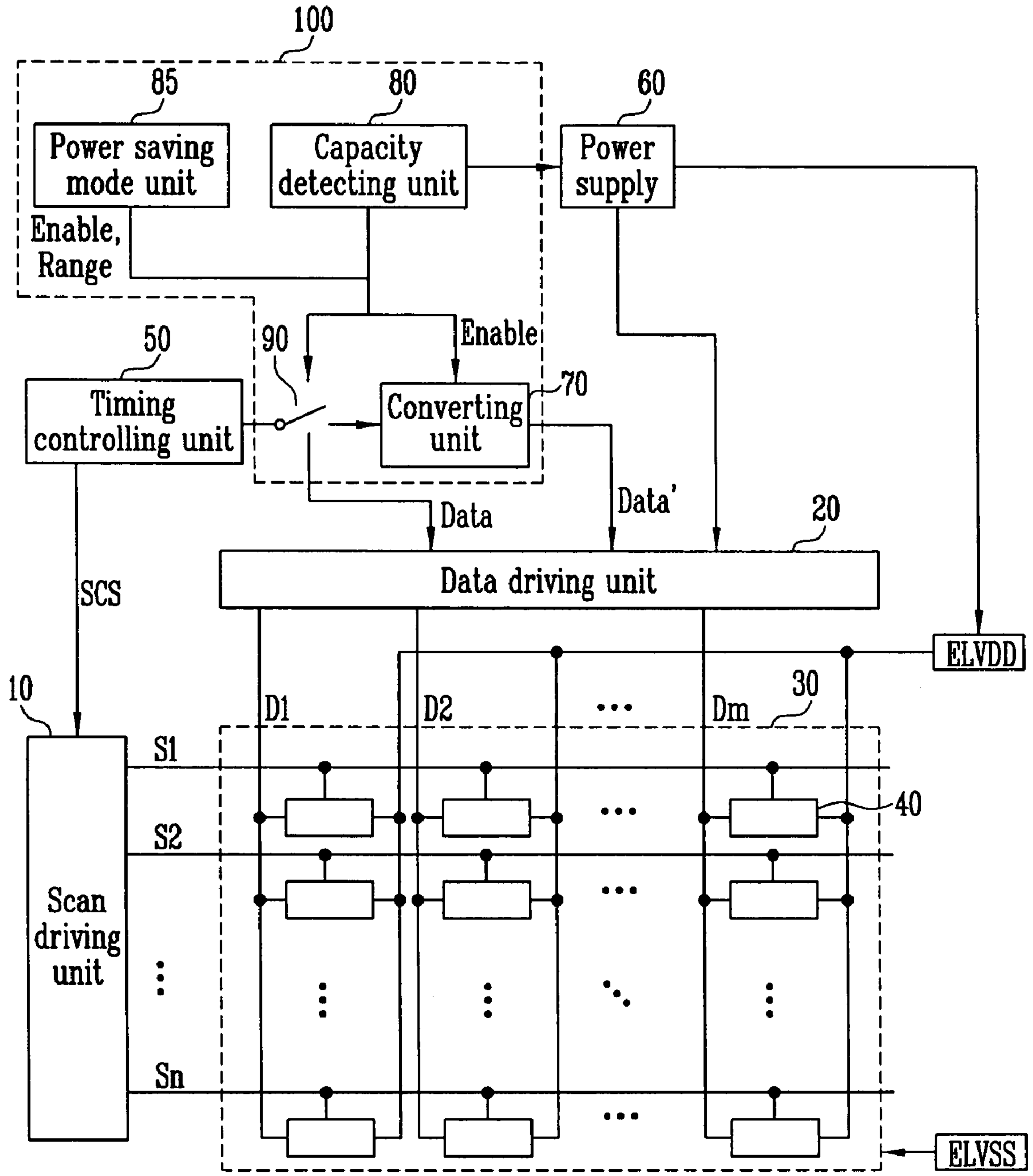
FIG. 1 illustrates a block diagram of an organic light emitting display device according to an embodiment.

Korean Patent Application No. 10-2009-0006201, filed on Jan. 23, 2009, in the Korean Intellectual Property Office, and entitled: "Organic Light Emitting Display Device and Driving Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 illustrates a block diagram of an organic light emitting display device according to an embodiment.

Referring to FIG. 1, an organic light emitting display device may include a pixel unit 30 having a plurality of pixels 40 connected to scan lines S1 to Sn and data lines D1 to Dm, a scan driving unit 10 for driving the scan lines S1 to Sn, a data driving unit 20 for driving the data lines D1 to Dm, a timing controlling unit 50 or controlling the scan driving unit 10 and the data driving unit 20, and a power supply 60 for supplying electric power to the pixel unit 30 to the timing controlling unit 50. Neighboring three pixels 40 for emitting red, green, and blue lights may form a single unit pixel.

The organic light emitting display device may further include a power saving unit 100. The power saving unit 100 may include a converting unit 70, a capacity detecting unit 80, a power saving mode unit 85, and a switching unit 90.

The timing controlling unit 50 may generate a data driving control signal and a scan driving control signal SCS in response to a synchronizing signal provided from the outside. The timing controlling unit 50 may supply the data driving control signal to the data driving unit 20 and supply the scan driving control signal SCS to the scan driving unit 10. The timing controlling unit 50 may supply first data Data supplied from the outside to the data driving unit 20 or to the converting unit 70 according to, e.g., user control, a state of a power supply, etc., as described in detail below.

The scan driving unit 10 may receive the scan driving control signal from the timing controlling unit 50. In response thereto, the scan driving unit 10 may generate scan signals and may sequentially supply the generated scan signals to the scan lines S1 to Sn.

The data driving unit 20 may receive the data driving control signal from the timing controlling unit 50. In response thereto, the data driving unit 20 may generate data signals and may supply the generated data signals to the data lines D1 to Dm such that the data signals are synchronized with the scan signals.

The pixel unit 30 may receive a first power ELVDD and a second power ELVSS from the outside, and may supply the same to the respective pixels 40. In response to data signals, each of the pixels 40 may control electric current flowing from the first power ELVDD to the second power ELVSS via a light emitting device to generate light corresponding to the data signals. In other words, the respective pixels 40 may generate light of a predetermined brightness in response to the data signals.

As discussed above, the timing controlling unit 50 may supply first data Data supplied from the outside to the data driving unit 20 or to the converting unit 70 according to, e.g., user control, a state of a power supply, etc. Accordingly, in this embodiment, the converting unit 70 may receive the first data Data from the timing controlling unit 50, may convert the first data Data into the second data Data', and may transmit the same the data driving unit 20. The converting unit 70 may be enabled by user selection of a power saving mode, or when a remaining capacity of the power supply 60 is less than a reference value, etc. When the converting unit 70 is not enabled, the first data Data may be directly input into the data driving unit 20 through the timing controlling unit 50, as described above.

When using the organic light emitting display device as a display of a portable device, e.g., a laptop computer, a personal digital assistant (PDA), and a portable multimedia player (PMP), since a background to be displayed on the display is generally white, the organic light emitting display device, by being a self-emission device, has a high power consumption.

Assuming that data supplied from the timing controlling unit 50 is 8-bit digital data, data may be converted into a data signal of an analog data (voltage) corresponding to the data bit by the data driving unit 20 and may be applied to the respective pixels 40. By doing so, each of the pixels 40 may emit light at a gray scale corresponding to the data signal among 256 gray scales (0 to 255 gray scales).

In this case, therefore data having the highest digital bit displays the brightest white (255 gray scale) so that data having the lowest digital bit displays the darkest black (0 gray scale).

However, since each of the pixels emits red, green, and blue light to form a single unit pixel, when a data signal corresponding to data having the highest digital bit is applied to a pixel of a particular color, e.g., a red pixel, the brightest red (255 gray scale) is displayed. When a data signal corresponding to data having the lowest digital bit is applied, the darkest red (0 gray scale) is displayed.

Therefore, since white is displayed by the unit pixel when data signals corresponding to data having the highest digital bit are applied to the red, green, and blue pixels for forming the unit pixel, the power consumption is increased when white is displayed on much of the screen.

Thus, in this embodiment, the first data Data provided by the timing controlling unit 50 may be directly supplied to the data driving unit 20 without passing through the converting unit 70 when the capacity of the power supply 60 is sufficient. However, when the remaining capacity of the power supply 60 is less than a reference value as determined by the capacity detecting unit 80 or when a user selects a power saving mode as indicated by the power saving mode unit 85, the converting unit 70 may be enabled. Further, the switching unit 90 may be switched such that the first data Data provided from the timing controlling unit 50 is input to the converting unit 70, rather than directly to the data driving unit 20. Then, the converting unit 70 may convert the first data Data into the second data Data' and may output the second data Data' to the data driving unit 20.

In particular, when the first data Data corresponds to a bright color, e.g., 255 to 230 gray scales, the first data Data may be converted into second data Data' to display a dark color, e.g., 0 to 25 gray scales. When the first data Data corresponds to the dark color, the first data Data may be converted into second data Data' to display the bright color.

That is, when the first data Data has a digital bit corresponding to a first range, e.g., 255 to 230 gray scales, for displaying white-related colors or a second range, e.g., 0 to 25 gray scales, for displaying black-related colors, the first data Data input into the converting unit 70 may be reversely changed, such that the first data Data for displaying white-related colors is converted into the second data Data' for displaying black-related colors and the first data Data for displaying black-related colors is converted into the second data Data' for displaying the white-related colors.

In other words, when the remaining capacity of the power supply 60 is less than the reference value or the user selects the power saving mode, the capacity detecting unit 80 or the power supply mode unit 85 may output the enable signal to the converting unit 70 and the switching unit 90. In response, the switching unit 90 may output the first data Data input to the converting unit 70, which, in turn, may convert the first data Data into the second data Data' by reversely changing colors when the first data Data is in an achromatic color range, i.e., one of the first and second ranges for displaying white-related colors and black-related colors, respectively. The second data Data' may be supplied to the data driving unit 20.

Operation when the remaining capacity of the power supply 60 is less than the reference value will be described as follows.

The capacity detecting unit 80 may compare the capacity of the power supply 60 with a predetermined, stored reference capacity value. The capacity detecting unit 80 may include a memory (not shown) in which the reference capacity value of the power supply is stored and a comparator (not shown) to compare the remaining capacity of the power supply 60 with the reference capacity value.

When the remaining capacity of the power supply 60 is less than the reference value, the capacity detecting unit 80 may provide an enable signal to the converting unit 70 to start the converting unit 70. At the same time, the enable signal may also be provided to the switching unit 90 disposed between the timing controlling unit 50 and the converting unit 70 such that the first date Data supplied from the timing controlling unit 50 is supplied to the converting unit 70.

Accordingly, the converting unit 70 may convert the first data Data supplied from the timing controlling unit 50 into the second data Data' and may supply the converted second data Data' to the data driving unit 20.

At this time, with respect to the first data Data input into the converting unit 70, when the first data Data has a digital bit corresponding to the first range of displaying the white-related colors, for example 255 to 230 gray scales, the first data Data is reversely converted into the second data Data' having a digital bit corresponding to the second range of displaying the black-related colors, that is, 0 to 25 gray scales. For example, when the input first data Data is a digital signal having a bit of 11111111 corresponding to 255 gray scale, the converting unit 70 may convert the first data Data into a digital signal having a digital bit of 00000000 corresponding to 0 gray scale, i.e., the second data Data', and may output the second data Data' to the data driving unit 20.

In contrast, when the first data Data input into the converting unit 70 has a digital bit corresponding to the second range of displaying black-related colors, e.g., a digital bit corresponding to 0 to 25 gray scales, the converting unit 70 may reversely convert the first data Data into the second data Data' having the first range for displaying white-related colors, e.g., a digital bit corresponding to 255 to 230 gray scales. For example, when the input first data Data is a digital signal having a digital bit of 00000000 corresponding to 0 gray scale, the converting unit 70 may convert the first data Data into a digital signal, e.g., the second data Data having a digital bit of 11111111 corresponding to 255 gray scale, and may provide the converted second data Data' to the data driving unit 20.

However, when the input first data Data is outside the first and second ranges, i.e., does not correspond to the first range and the second range, e.g., has a digital bit corresponding to 26 gray scale to 229 gray scale, the first data Data may be output as the second data Data' to the driving unit 20 without conversion. In other words, the converting unit 70 may be configured not to alter the first data Data, i.e., the second data Data' within the intermediate range output form the converting unit 70 may be the same as the first data Data input.

The first and second ranges may correspond to the achromatic color range. Gray scales corresponding to the first and second ranges may be adjusted by a user through the power saving mode unit 85, as indicated by a range signal output by the power saving mode unit 85, as described in detail later.

Thus, in accordance with embodiments, color of a screen generally displayed by a white background may be reversely changed and displayed in black by the converting unit 70. This conversion may be particularly useful when applied to the organic light emitting display device, which is a self-emission device, to reduce power consumption. That is, pixels that are to display a bright image occupying a majority of the screen may be controlled to have a low brightness, so that an amount of light emitted in the power saving mode is much less than that in a normal mode. Consequently, power consumption may be reduced.

As described above, non-light emitting device, e.g., an LCD, displays an image due to light emission from a backlight, so power consumption of a black tone image and a white tone image displayed by the LCD are substantially the same. Therefore, the backlight must be turned off in order to reduce power consumption. Therefore, embodiments may be less effective in the LCD than when to be applied to a light emissive display device, e.g., to the organic light emitting display device.

Figure 2:
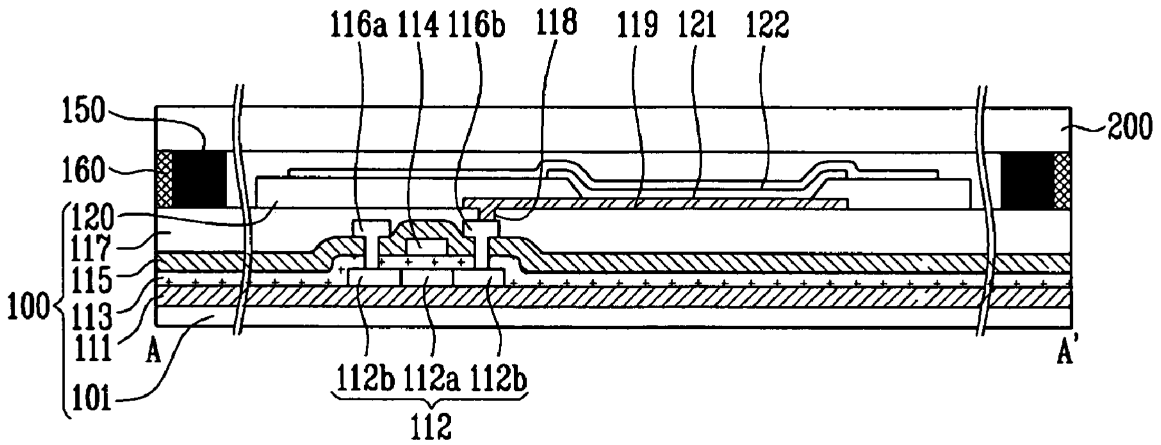
FIG. 2 illustrates a sectional view of a region of a pixel unit shown in FIG. 1.

FIG. 2 illustrates a sectional view of a region of the pixel unit 40 of FIG. 1. In particular, FIG. 2 illustrates a sectional view of an organic light emitting display device for emitting light and a transistor connected thereto in a pixel for forming a pixel unit.

Referring to FIG. 2, in order to prevent a substrate 100 from being damaged by heat applied from the outside, a buffer layer 111 may be formed on a deposition substrate 101. The buffer layer 111 may be made of an insulating material, e.g., silicon oxide ($SiO_2$) or silicon nitride ($SiN_x$).

A semiconductor layer 112 having an active layer 112*a* and an ohmic contact layer 112*b* may be formed on at least one region of the buffer layer 111. A gate insulating layer 113 may be formed on the semiconductor layer 112 and the buffer layer 111. A gate electrode 114 having a size corresponding to a width of the active layer 112*a* may be formed on one region of the gate insulating layer 113.

An interlayer insulating layer 115 may be formed on the gate insulating layer 113 including the gate electrode 114, and source and drain electrodes 116*a* and 116*b* may be formed on a predetermined region of the interlayer insulating layer 115. The source and drain electrodes 116*a* and 116*b* may contact one exposed region of the ohmic contact layer 112*b*, respectively. A planarizing layer 117 may be formed on the interlayer insulating layer 115 including the source and drain electrodes 116*a* and 116*b*.

A first electrode 119 may be formed on one region of the planarizing layer 117 such that the first electrode 119 may contact one of exposed regions of the source and drain electrodes 116*a* and 116*b* through a via hole 118.

A pixel defining layer 120 including an opening for exposing at least one region of the first electrode 119 may be formed on the planarizing layer 117 including the first electrode 119. An organic layer 121 may be formed on the opening of the pixel defining layer 120. A second electrode layer 122 may be formed on the pixel defining layer 120 including the organic layer 121. A passivation layer may be further formed on the second electrode 122.

The organic layer 121 is provided between the first electrode 119 and the second electrode layer 122. The organic layer 121 may include an organic light emitting layer that emits light due to energy generated by combining holes received from an anode and electrons received from a cathode with each other in the organic light emitting layer to form excitons as hole-electron pairs, which emit light as the excitons return to ground state.

The generated excitons form singlet excitons or triplet excitons according to spin coupling type. The probability of forming the singlet excitons is 1/4 and the probability of forming the triplet excitons is 3/4.

In general, since the ground state of an organic molecule is a triplet state, the organic molecules may transition to the ground state while emitting light by the singlet exciton. This phenomenon is referred to as fluorescence. A fluorescent organic light emitting diode employs this organic molecule.

However, since the transition of the triplet exciton to the ground state of the singlet exciton while emitting light is prohibited, 75% of the excitons is wasted. Accordingly, a phosphorescent dopant with large spin orbit coupling may be used in a light emitting layer so that the triplet state may transition to the ground state to emit light. This phenomenon is referred to as phosphorescence. A phosphorescent organic light emitting diode employs this organic molecule.

An organic light emitting display device according to embodiments may employ any one of the fluorescent and phosphorescent organic light emitting diodes.

An encapsulating substrate 200 may encapsulate at least of a region of the substrate 101 on which the organic light emitting diodes are formed, and may be bonded to the evaporating substrate 101 by a sealant 150. A reinforcing member 160 may be formed to a line side of the sealant 150 and may serve as a sealing agent when the sealant 150 is welded but not bonded or has a weakened adhesive force.

The encapsulating substrate 200 may be transparent for use in top or bottom emission display devices or may be opaque for bottom emission display devices. In embodiments, material for the encapsulating substrate 200 is not limited, but glass may be used as the encapsulating substrate 200 for the top emission display device.

Since the organic light emitting display device described with reference to FIGS. 1 and 2 displays an image using the organic light emitting display device as a self-emission device, the organic light emitting display device does not need a backlight (unlike the conventional LCD) and may be implemented by a considerably thin structure, e.g., a card type structure.

Figure 3:
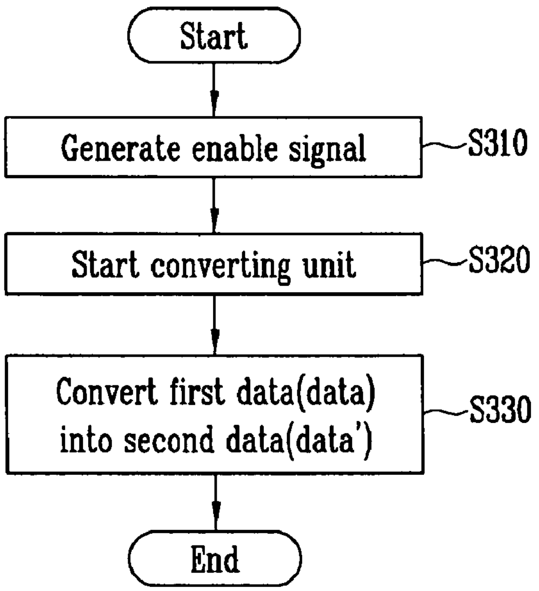
FIG. 3 illustrates a flow chart of a method of driving an organic light emitting display device according to an embodiment.
Figure 4:
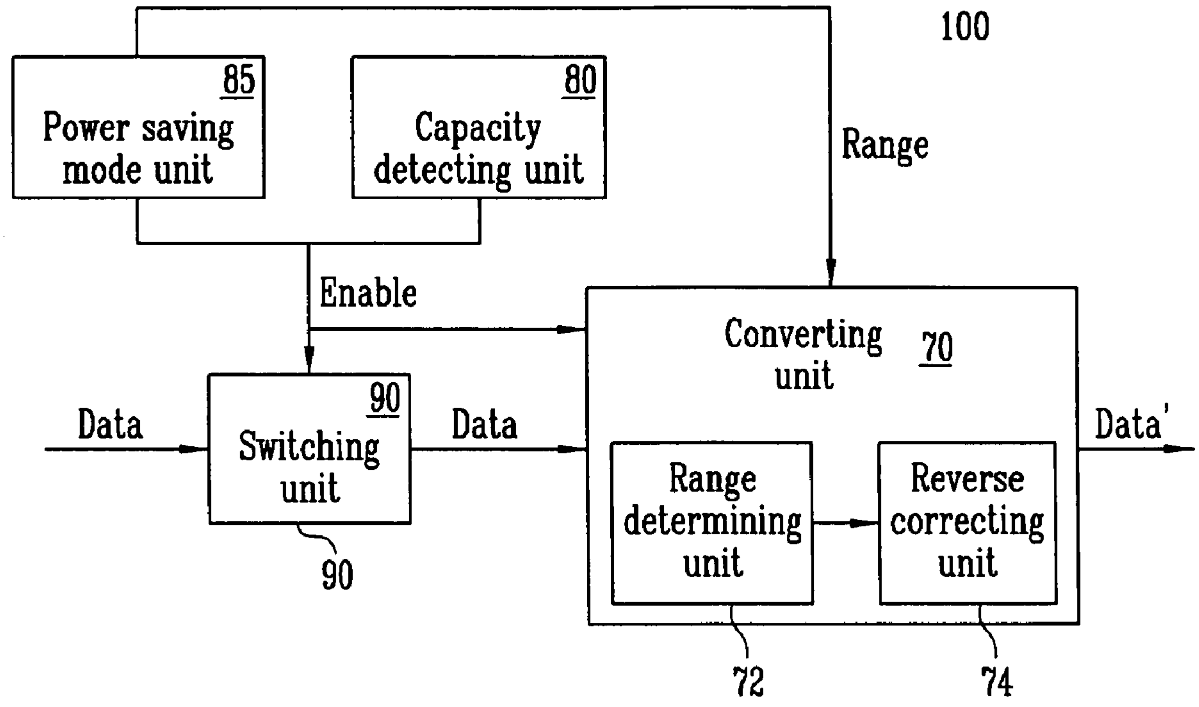
FIG. 4 illustrates a detailed block diagram of the power saving unit of FIG. 1 according to an embodiment.

FIG. 3 illustrates a flow chart of a method of driving an organic light emitting display device according to an embodiment. FIG. 4 illustrates a detailed block diagram of the power saving unit 100 of FIG. 1.

Referring to FIGS. 1, 3, and 4, first, an enable signal to start the converting unit 70 may be generated in operation S310. The enable signal may be generated from the capacity detecting unit 80 when the remaining capacity of the power supply to be supplied to the organic light emitting display device is less than the predetermined reference value. Additionally or alternatively, the enable signal may be generated by a user, e.g., by manipulating a key input unit (not shown), of the power saving mode unit 85 of the portable device having the organic light emitting display device.

In response to the enable signal, the converting unit 70 may be started and the first data Data supplied from the timing controlling unit 50 to the data driving unit 20 may be supplied from the timing controlling unit 50 to the converting unit 70 through the switching unit 90 in operation 5320. Thereafter, the converting unit 70 may convert the first data Data supplied from the timing controlling unit 50 into the second data Data' and may provide the second data Data' to the data driving unit 20 in operation 330. In particular, as illustrated in FIG. 4, the converting unit 70 may include a range determining unit 72 and a reverse correcting unit 74.

When the range determining unit 72 determines that the first data Data input into the converting unit 70 is within the first range for displaying white-related colors, e.g., corresponding to 255 gray scale to 230 gray scale, the first data Data may be reversely changed and converted into the second data Data' having the second range of displaying black-related colors, e.g., a digital bit corresponding to 0 to 25 grays scales, respectively, by the reverse correcting unit 74. When the range determining unit 72 determines that the first data Data input into the converting unit 70 is within the second range for displaying black-related colors, e.g., a digital bit corresponding to 0 to 25 gray scales, the first data Data may be reversely changed and converted into the second data Data' having the first range for displaying white-related colors, e.g., a digital bit corresponding to 255 to 230 gray scales, respectively, by the reverse correcting unit 74. Finally, when the range determining unit 72 determines that the input first data Data is not within the first or second ranges, i.e., does not correspond to the first range and the second range, e.g., has digital bit corresponding to 26 to 229 gray scales, the first data Data may be transmitted through the converting unit 70 to the data driving unit 20 as the second data Data' without conversion.

In other words, to maintain contrast and a viewable image, the highest gray scale may be converted into the lower gray scale, i.e., 255 to 0, 254 to 1, and so forth, and vice versa, while gray scale outside these extreme ranges may be maintained. Further, the user may alter the bounds of the extreme ranges by inputting the range signal Range to the converting unit 70. The input extreme ranges may replace the default extreme ranges in the range determining unit 72, resulting in values outside these ranges, i.e., within an intermediate range, not being reverse converted by the reverse converting unit 74, such that within the intermediate range, the second data Data' output by the converting unit 72 may be the same as the first data Data input thereto.

The first and second ranges may correspond to the achromatic color range. Further, the first and second ranges may be adjusted by a user or in accordance with a remaining capacity of the power supply.

In accordance with embodiments, a screen having a white background may be reversely changed into a screen having a black background by the converting unit 70. When this conversion is applied to a self-emission device, e.g., an organic light emitting display device, reduce power consumption may be reduced. That is, light emitted by pixels in a majority of the screen may be controlled to have a low brightness, so that an amount of light emitted in the power saving mode is much less than that in a normal mode. Consequently, power consumption may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An organic light emitting display device, comprising:

a pixel unit including a plurality of pixels connected to scan lines and data lines;

a data driving unit configured to receive a first data or a second data and to provide data signals corresponding to the first or second data to the data lines;

a timing controlling unit configured to control the data driving unit and to supply the first data input from the outside;

a power supply configured to supply electric power to the pixel unit, the data driving unit, and the timing controlling unit;

a converting unit configured to receive the first data from the timing controlling unit, convert the first data into the second data, and transmit the converted second data to the data driving unit; and a switching unit configured to receive the first data from the timing controlling unit and to output the first data to one of the data driving unit and the converting unit in accordance with at least one of a user input and a capacity of the power supply, wherein, when the first data supplied from the timing controlling unit has a digital bit corresponding to one of a first range and a second range, the converting unit is configured to convert the first data into the second data having a digital bit corresponding to the second range and the first range, respectively, the first range corresponding to a predetermined number of grayscales starting at 255, and the second range corresponding to the predetermined number of grayscales starting at 0.

2. The organic light emitting display device as claimed in claim 1, further comprising a capacity detecting unit configured to generate an enable signal to start the converting unit when a remaining capacity of the power supply is less than a predetermined reference value, the enable signal being output to the converting unit.

3. The organic light emitting display device as claimed in claim 1, wherein the first range and the second range correspond to an achromatic color range.

4. The organic light emitting display device as claimed in claim 1, wherein data corresponding to the first range has a digital bit corresponding to 255 to 230 gray scales.

5. The organic light emitting display device as claimed in claim 1, wherein data corresponding to the second range has a digital bit corresponding to 0 to 25 gray scales.

6. The organic light emitting display device as claimed in claim 1, the converting unit is configured to output the first data to the data driving unit when the first data is outside the first and second ranges.

7. The organic light emitting display device as claimed in claim 1, further comprising a power saving mode unit configured to generate an enable signal to start the converting unit when a user selects a power saving mode, the enable signal being output to the converting unit.

8. A method of driving a self-emission display device, the method comprising:

supplying first data from outside;

determining whether the first data is within one of a first range for displaying white-related colors and a second range for displaying black-related colors; and reverse converting, when the first data is within one of the first and second ranges, the first data into second data having a digital bit corresponding to the second range and the first range, respectively, wherein the first data is supplied to the data driving unit when the first data is outside the first and second ranges.

9. The method as claimed in claim 8, further comprising, before determining, generating an enable signal to start determining.

10. The method as claimed in claim 9, wherein generating the enable signal occurs when a remaining capacity of the power supply is less than a predetermined reference value.

11. The method as claimed in claim 9, wherein generating the enable signal occurs when a user selects a power saving mode.

12. The method as claimed in claim 8, wherein the first and second ranges correspond to an achromatic color range.

13. The method as claimed in claim 8, wherein data corresponding to the first range has a digital bit corresponding to 255 to 230 gray scales.

14. The method as claimed in claim 8, wherein data corresponding to the second range has a digital bit corresponding to 0 to 25 gray scales.

15. A power saving unit for use with a self-emission display device, comprising:

a range determining unit configured to determine whether first data supplied from outside is within one of a first range for displaying white-related colors and a second range for displaying black-related colors; and a reverse converting unit configured to convert, when the range determining unit determines that the first data is within one of the first and second ranges, the first data into second data having a digital bit corresponding to the second range and the first range, respectively, and to output the second data to the self-emission display device, wherein the reverse converting unit is configured to output the first data as the second data when the first data is outside either of the first and second ranges.

16. The power saving unit as claimed in claim 15, further comprising a switching unit configured to output the first data to the self-emission display device in a normal mode and to output the first data to the range determining unit when in a power saving mode.

17. The power saving unit as claimed in claim 16, further comprising at least one of a capacity detecting unit configured to indicate the power saving mode when a remaining capacity of a power supply of the self-emissive display device is below a predetermined reference value and a power saving mode unit configured to indicate the power saving mode when selected by a user.

* * * * *